(12) United States Patent
Vishnia-Shabtai et al.

(10) Patent No.: US 7,577,907 B2
(45) Date of Patent: Aug. 18, 2009

(54) SYSTEM AND METHOD FOR DYNAMICALLY CONSTRUCTING SYNCHRONIZED BUSINESS INFORMATION USER INTERFACES

(75) Inventors: Nimrod Vishnia-Shabtai, Kfar Vradim (IL); Isam Awad, Ibillin (IL); Walter Kahn, Carmiel (IL); Raja Nasrallah, Kfar Vradim (IL)

(73) Assignee: SAP, Aktiengesellschaft, Walldorf (DE)

( * ) Notice: Subject to any disclaimer, the term of this patent is extended or adjusted under 35 U.S.C. 154(b) by 1091 days.

(21) Appl. No.: 10/990,292

(22) Filed: Nov. 15, 2004

(65) Prior Publication Data

US 2006/0106897 A1 May 18, 2006

(51) Int. Cl.
*G06F 17/00* (2006.01)
(52) U.S. Cl. .................................... 715/255; 715/735
(58) Field of Classification Search ............... 715/200, 715/255, 243, 735; 713/1, 100; 707/1
See application file for complete search history.

(56) References Cited

U.S. PATENT DOCUMENTS

| | | | | |
|---|---|---|---|---|
| 7,089,583 | B2 * | 8/2006 | Mehra et al. | 726/3 |
| 7,181,686 | B1 * | 2/2007 | Bahrs | 715/210 |
| 7,275,243 | B2 * | 9/2007 | Gibbons et al. | 717/159 |
| 2005/0055633 | A1 * | 3/2005 | Ali et al. | 715/513 |
| 2005/0125621 | A1 * | 6/2005 | Shah | 711/173 |
| 2005/0273521 | A1 * | 12/2005 | Patrick et al. | 709/246 |

OTHER PUBLICATIONS

Wang, Shaojie, et al, "Modeling and Integration of Peripheral Devices in Embedded Systems", Date '03: Proceedings of the Conference on Design, Automation and Test in Europe—vol. 1, Mar. 2003, pp. 1-6.*

* cited by examiner

*Primary Examiner*—Laurie Ries
(74) *Attorney, Agent, or Firm*—Dalina Law Group, P.C.

(57) ABSTRACT

Embodiments of the invention enable data that is synchronized between businesses to be displayed and interacted with by dynamically constructing graphical user interfaces to display the data. The graphical user interfaces are dynamically created via declarations that describe the data and how the data should be displayed along with the dependencies, validation and required characteristics of the data. The resulting dynamically created graphical user interfaces allow separate views of the data to be interacted with depending on the data pool that the data is intended for and a different data pool may be utilized by using a different declarative configuration at run time without recompiling and redistributing the application. The user interface files may be for example an XML file that may be parsed with any compliant schema based or DTD based XML parser. In at least one embodiment of the invention an N-tier architecture may be employed wherein a web server comprising Java Server Pages may utilize java class files that parse and construct the graphical user interface from an XML user interface configuration file. In this embodiment of the invention, HTML pages are output to a diverse array of computing devices capable of executing a HTML compliant browser. Another embodiment of the invention may utilize a standalone application utilizing the same java classes to construct java widgets instead of HTML widgets. Standalone applications may provide quicker responses than HTML applications since there are no round trips required for certain operations such as validation since the validation occurs directly in the application.

7 Claims, 6 Drawing Sheets

FIGURE 3

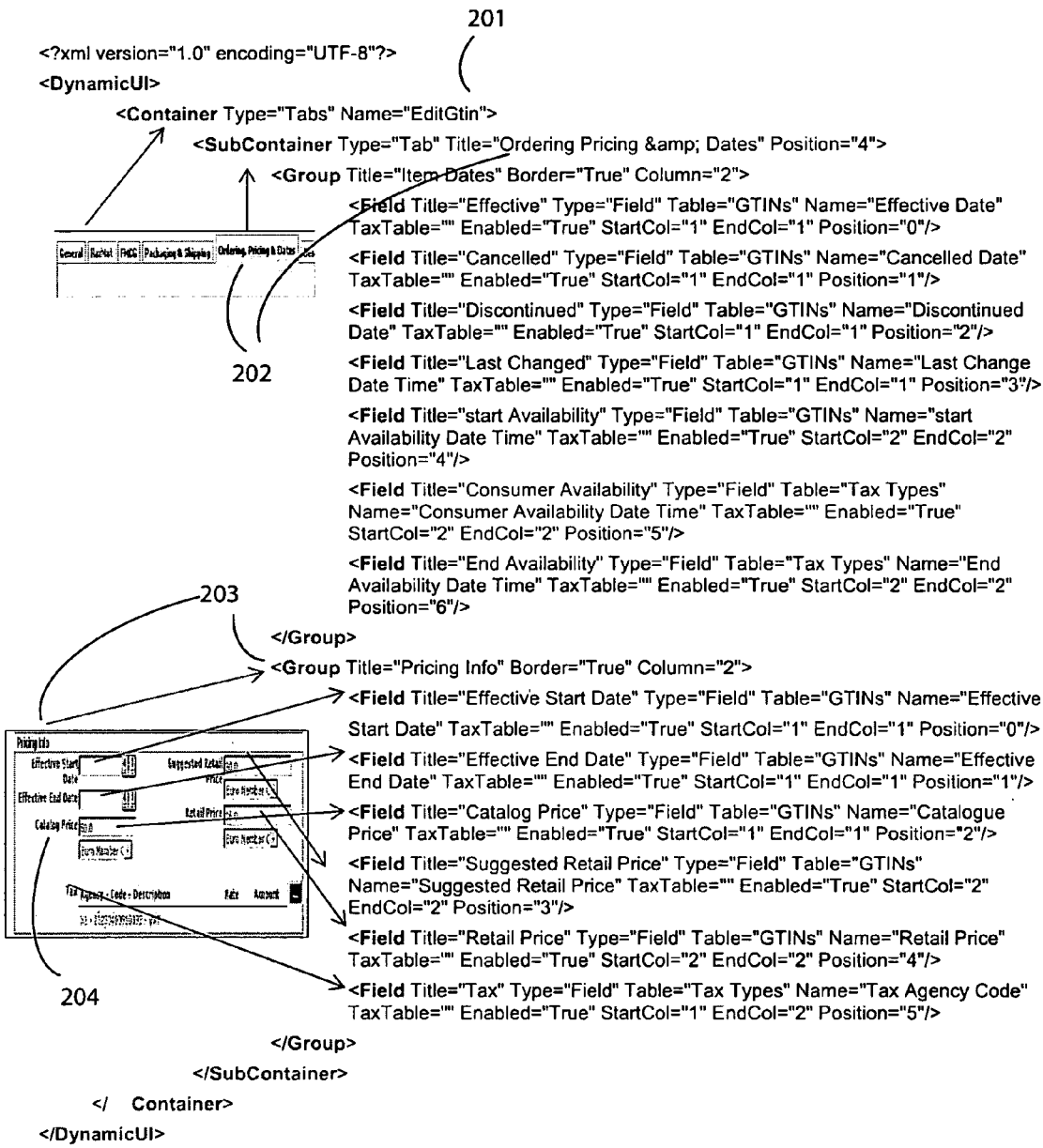

```
<?xml version="1.0" encoding="UTF-8"?>
<DynamicUI>
    <Container Type="Tabs" Name="EditGtin">
        <SubContainer Type="Tab" Title="Ordering Pricing & Dates" Position="4">
            <Group Title="Item Dates" Border="True" Column="2">
                <Field Title="Effective" Type="Field" Table="GTINs" Name="Effective Date"
                TaxTable="" Enabled="True" StartCol="1" EndCol="1" Position="0"/>
                <Field Title="Cancelled" Type="Field" Table="GTINs" Name="Cancelled Date"
                TaxTable="" Enabled="True" StartCol="1" EndCol="1" Position="1"/>
                <Field Title="Discontinued" Type="Field" Table="GTINs" Name="Discontinued
                Date" TaxTable="" Enabled="True" StartCol="1" EndCol="1" Position="2"/>
                <Field Title="Last Changed" Type="Field" Table="GTINs" Name="Last Change
                Date Time" TaxTable="" Enabled="True" StartCol="1" EndCol="1" Position="3"/>
                <Field Title="start Availability" Type="Field" Table="GTINs" Name="start
                Availability Date Time" TaxTable="" Enabled="True" StartCol="2" EndCol="2"
                Position="4"/>
                <Field Title="Consumer Availability" Type="Field" Table="Tax Types"
                Name="Consumer Availability Date Time" TaxTable="" Enabled="True"
                StartCol="2" EndCol="2" Position="5"/>
                <Field Title="End Availability" Type="Field" Table="Tax Types" Name="End
                Availability Date Time" TaxTable="" Enabled="True" StartCol="2" EndCol="2"
                Position="6"/>
            </Group>
            <Group Title="Pricing Info" Border="True" Column="2">
                <Field Title="Effective Start Date" Type="Field" Table="GTINs" Name="Effective
                Start Date" TaxTable="" Enabled="True" StartCol="1" EndCol="1" Position="0"/>
                <Field Title="Effective End Date" Type="Field" Table="GTINs" Name="Effective
                End Date" TaxTable="" Enabled="True" StartCol="1" EndCol="1" Position="1"/>
                <Field Title="Catalog Price" Type="Field" Table="GTINs" Name="Catalogue
                Price" TaxTable="" Enabled="True" StartCol="1" EndCol="1" Position="2"/>
                <Field Title="Suggested Retail Price" Type="Field" Table="GTINs"
                Name="Suggested Retail Price" TaxTable="" Enabled="True" StartCol="2"
                EndCol="2" Position="3"/>
                <Field Title="Retail Price" Type="Field" Table="GTINs" Name="Retail Price"
                TaxTable="" Enabled="True" StartCol="2" EndCol="2" Position="4"/>
                <Field Title="Tax" Type="Field" Table="Tax Types" Name="Tax Agency Code"
                TaxTable="" Enabled="True" StartCol="1" EndCol="2" Position="5"/>
            </Group>
        </SubContainer>
    </Container>
</DynamicUI>
```

FIGURE 4

```
<Group Id="hazmatGroup" Title="" Border="False" Columns="1" Position="0">
<Field Id="hazmatInfRequired" Title="Hazmat Information Required" Type="Field" Table="GTINs"
Name="Dangerous Goods Indicator" TaxTable="" StartCol="1" EndCol="1" Position="0" Enabled="True"/>
<Field Id="msdsNumber" Title="MSDS Number" Type="Field" Table="GTINs" Name="MSDS Number"
TaxTable="" StartCol="1" EndCol="1" Position="1" Enabled="True" Mandatory="Dependent"
dependencyRuleClass=" hazmatGroup Dependency " >
    </Field>
```
401
```
<Field Id="regulationCode" Title="Regulation Code" Type="Field" Table="Hazardous Information"
Name="Dangerous Goods Regulation Code" TaxTable="" StartCol="1" EndCol="1" Position="3"
Enabled="Dependent" Mandatory="Dependent" dependencyRuleClass=" RegulationCodeDependency "
>
    </Field>
<Field Id="packingGroup" Title="Packing Group" Type="Field" Table="Hazardous Information"
Name="Dangerous Goods Packing Group" TaxTable="" StartCol="1" EndCol="1" Position="4" Enabled="True"
Mandatory="False"/>
<Field Id="unNumber" Title="UN Number" Type="Field" Table="Hazardous Information" Name="United Nations
Dangerous Goods Number" TaxTable="" StartCol="1" EndCol="1" Position="5" Enabled="True"
Mandatory="False"/>
</Group>
```

| HazMat | Packaging & Shipping | Ordering, Pricing & Dates | Descriptio |

☑ Hazmat Information Required

*MSDS Number  [ag34784]

*Class

*Regulation Code  [SELECT ▼]

Packing Group

UN Number

400

This "Regulation Code" field is example of field that has mandatory dependency and enabled dependency.

Mandatory – depend on:
 1. "Hazmat Information Required" field.

Enabled – depend on three fields:
 1. "Class"
 2. "Packing Group"
 3. "UN Number"

SYSTEM AND METHOD FOR DYNAMICALLY CONSTRUCTING SYNCHRONIZED BUSINESS INFORMATION USER INTERFACES

BACKGROUND OF THE INVENTION

1. Field of the Invention

Embodiments of the invention described herein pertain to the field of computer software. More particularly, but not by way of limitation, one or more embodiments of the invention enable the dynamic creation of graphical user interfaces (GUIs) containing a set of one or more components configured to operate on data that is synchronized between businesses.

2. Description of Related Art

The business of manufacturing and distributing products to various retailers worldwide requires extensive collaboration, organization and the efficient exchange of information between parties involved in the supply chain. For instance, the synchronization of information that uniquely describes a product or service exchanged between trading partners is fundamental to building collaborative commercial relationships among retailers, manufacturers, and other supply chain participants. Various systems exist for synchronizing such business-to-business information between trading partners. These systems, often referred to as Global Data Synchronization (GDS) systems, are important because effective GDS systems lead to consolidation and management of master product data, which greatly increases internal supply chain efficiency. Many also consider GDS as a fundamental building block for realizing the full potential of Radio Frequency Identification (RFID) and Electronic Product Code (EPC) tags on various product configurations (e.g., pallets and cases of a particular product). GDS and EPC initiatives are designed to work together to improve business performance amongst a set of interrelated trading partners through the sharing of well-formed data that describes information associated with a set of products or services.

Entities referred to as data pools act as an interface point between supply chain entities such as manufacturers and retailers. These data pools provide a message-based framework for synchronizing item, organization and pricing data. For instance, manufactures publish data to the data pool in accordance with a set of specific rules defined by the data pool and other parties such as retailers or other manufactures subscribed to the data pool are kept in sync with information published to the data pool.

In order to find a product of interest, an entity known as the "Global Registry" may be employed in order to lookup the basic parameters of a product. The lookup generally includes the location of the data pool where the full product information can be found. The predominant registry in the industry is known as the "GS1 Global Registry™". The Global Registry stores unique product identifiers (referred to as GTINs and discussed in further detail below) and location information about each of the respective parties in the supply chain (e.g., Global Location Numbers called GLNs and also discussed in more detail below). Put generally a GTIN describes what an item is and a GLN describes who has and where the item is located. The association of data pools and the Global Registry described herein are known as the Global Data Synchronization Network (GDSN).

To enable the manufacturers (data suppliers) and retailers (data pool customers) to utilize the Global Registry and synchronize data with one another each party should perform the following basic steps. First internal supplier data is reviewed and if necessary modified to conform to generally accepted standards. For instance, each product or unit of sale is given a GTIN. The GTIN provides a basis for identifying when a unit of sale passes through a retail point of sale, is delivered, ordered, invoiced, or is otherwise involved in a transaction. A GTIN comprises up to 14 digits and can be associated with raw materials or completed end user products and may also include services. The number allocated to a product needs to be communicated from the manufacturer through the supply chain in advance of transaction, so that business transactions can be set up.

The internal supplier may also define information that uniquely identifies itself and other legal entities, trading parties and locations considered part of or needing access to supply chain information. This identifying information, typically referred to as a Global Location Number (GLN), provides a standard means of identification. The GLN is simply a 13-digit number used to uniquely identify any legal, functional or physical entity. Some examples of parties and locations that can be identified with GLNs, include but are not limited to, functional entities such as a purchasing department or customer number within a legal entity, an accounting department, a returns department, a nursing station, or any other group that performs a definable set of functions. GLNs may also act as a mechanism for identifying physical entities such as a particular room or section of a building, a warehouse, or aspects of a physical location such as a loading dock, delivery point, cabinet, or other location specific information. It is also feasible to utilize GLNs to identify buyers, sellers, companies, subsidiaries or divisions such as suppliers, customers, financial services companies, or any other entity or trading partner.

Once the supplier's internal data is prepared that data is then uploaded to a source data pool that complies with appropriate standards. There are various data pools and each data pool has mandatory and optional aspects. For instance, a data pool may collect descriptive data that contains a standardized set of attributes, values, trade item information, trading partner information, product and packaging information (e.g., shipping unit information such as a pallet), consumer unit (e.g., typically a trade item in its retail form). In at least one instance attributes are used as a mechanism to name associated data (e.g., Color) and values identify the data itself associated to the attribute name (e.g., Blue). Both attributes and values can be recursive and thereby identified as a repeatable attribute/value. Any product or service having a need to retrieve pre-defined information that may be priced, ordered or invoiced at any point in any supply chain is typically referred to as a trade item. In this context, the term consumer unit is intended to indicate to the retailer that a particular item should be considered as a potential unit of sale.

The data pool sends basic information about the uploaded data to the Global Registry that in turn holds the information and stores the location of the supplier's data pool. Customers may search the Global Registry via their own destination data pool for information about the supplier that the customer may wish to obtain as part of its subscription to the destination data pool. The Global Registry identifies the source data pool of information that customers may request.

A synchronization engine enables trading partners to perform the publication/subscription process for sending and receiving information and synchronizes information between each of the respective data pools. The synchronization engine allows each trading partner to maintain a single point of entry to its chosen data pool. Once implemented, GDS allows for the continuous updating of data attributes related to products for example between a plurality of computing systems in order to ensure that the data is kept identical in all locations that access the data. This synchronization process occurs in order to keep businesses up to date with changes and modifications to products and prices for example. The proper update of product data also enables a more efficient supply chain and eliminates transactions with erroneous prices or discontinued products for example.

On the manufacturer/supplier side the process of reviewing and publishing items for registration and publication to retail trading partners is in most cases a laborious process that involves development of customized applications that obtain the relevant information from the manufacture side and provide that information to the data pool in a publishable form. In addition, current systems employed in the GDS arena suffer from hardcoded graphical user interfaces that embed references to schema elements within the control logic of the application. Mixing user interface code with control logic, business logic and database schema yields higher development, maintenance costs and increases the likelihood of errors. Furthermore, the time required to update an application is significant in that the application itself must be altered and sent to all users that require the modification. Because of these and other limitations present in current systems there is a need for a dynamic user interface that is easily adjusted to interface with different data pools and can allow for users to edit declarative definitions for the interfaces, validation rules, dependency rules and various data requirements that make up an application without requiring recompilation and redistribution of an application.

SUMMARY OF THE INVENTION

Embodiments of the invention enable data that is synchronized between businesses to be displayed and interacted with by dynamically constructing graphical user interfaces to display the data. Different entities synchronizing data throughout a supply chain will typically utilize different data pools and have different requirements for interacting with their data pool of choice. Even though multiple entities may utilize the same underlying standards based system to synchronize data the user interface requirements of one entity may significantly differ from the user interface requirements of another. Current systems lack a mechanism for dynamically creating a set of user interfaces customized to fit the definable needs of the entity that is to utilize the interface.

One or more embodiments of the invention overcome these and other limitations present in current systems by implementing a system and method for dynamically constructing customizable user interfaces that provide mechanisms for acting upon or inputting data into a repository of synchronized business information. Thus the invention enables each respective entity in the supply chain to generate and make use of an interface that suits their specific needs. For instance, systems incorporating one or more aspects of the invention are capable of dynamically generating a set of user interfaces that enables suppliers to input and publish data to a synchronization system configured to share the published data across a supply chain.

There are various techniques for creating these user interfaces. In one embodiment of the invention for instance, the system creates a user interface via declarations that describe the data to be displayed and how the data should be displayed along with what dependencies, validations and required characteristics are associated with the data. In a typical case systems implementing embodiments of the invention employ the use of a configuration file to define the declarations that detail the layout, content and behavior of the user interface.

The configuration file configuration may contain XML or other data used to define key aspects of the user interface that is to couple with the synchronization system. Any compliant schema or DTD based XML parser can be used to parse the XML data.

Systems implementing one or more aspects of the invention may employ an N-tier architecture wherein a web server comprising Java Server Pages and/or Servlets may utilize java class files that parse and construct the graphical user interface from an XML user interface configuration file. In this embodiment of the invention, HTML pages are output to a diverse array of computing devices capable of executing a HTML compliant browser. When used in a Global Data Synchronization context the resulting dynamically created set of user interfaces can provide separate views of the data the interface is associated with. For instance, the type of interaction that is feasible may vary depending on the data pool the data is intended to be associated with. If a customer wishes to switch data pools or if a separate customer to the same data pool wishes to interact with different data, it is feasible using one or more embodiments of the invention to define different declarative configurations at run time and thereby generate a customized interface that fits the customer requirements. Because users can modify the declarative configuration at run time it is not necessary to recompile and redistribute applications that contain a new interface.

On startup, the systems implementing one or more embodiments of the invention open a configuration file. This configuration file is then read for declarative definitions of containers, sub-containers, groups and fields. The processing loops until all items have been instantiated. If a field or sub-container interface appearance attribute is dependent upon the value of another field or fields then the logic rule is obtained as an external JAR file. An instance of the logic rule class may then be created via the Java Reflection API. For a web client interfacing to the system through a Java ServerPage (JSP), then the instance is local to the web server. For an applet instance or standalone application, the logic rule class is instantiated and utilized within the executable. The logic rule may set the dependent field or sub-container to enabled or disabled, visible or not visible, mandatory or not mandatory depending on the value of the current field or may set the enabled, visible or mandatory attributes of other fields based on the setting of the current field.

For security purposes embodiments of the invention may determine whether to display a field of the main database by checking the user name with regards to the table and field of the main database. The field may be visible or invisible to a given user or enabled or disabled to a given user depending on the user name and/or role of the user.

Embodiments of the invention may utilize java reflection to generate verification scripts for construction of Dynamic HTML validators. In another embodiment of the invention, a Java applet or standalone application may use the validation JAR file(s) as is and perform validation, dependency checking and required field checking on the client machine.

Although HTML widgets are widely used as a mechanism for generating user interfaces one or more embodiments of the invention are capable of providing the same functionality to standalone applications that execute independent of the HTML browser. These standalone applications may utilize the java classes to construct java widgets instead of HTML forms. Standalone applications typically provide for more efficient execution than HTML applications because there is no need to send and receive information to a server in order to perform certain operations such as validation. When the application is standalone validation occurs directly in the application itself. The downside to using standalone applications is that it is important to utilize a know Virtual Machine (VM) to execute the application. If control over the VM is not feasible information technology personal have a limited ability to successfully maintain the application.

BRIEF DESCRIPTION OF THE DRAWINGS

FIG. 3 illustrates an embodiment of an XML listing that declaratively defines the interface of FIG. 2.

FIG. 4 illustrates an embodiment of an XML listing that declaratively defines a rule class to be used in determining the settings of dependent fields when a particular field is altered.

DETAILED DESCRIPTION OF THE INVENTION

Figure 1:
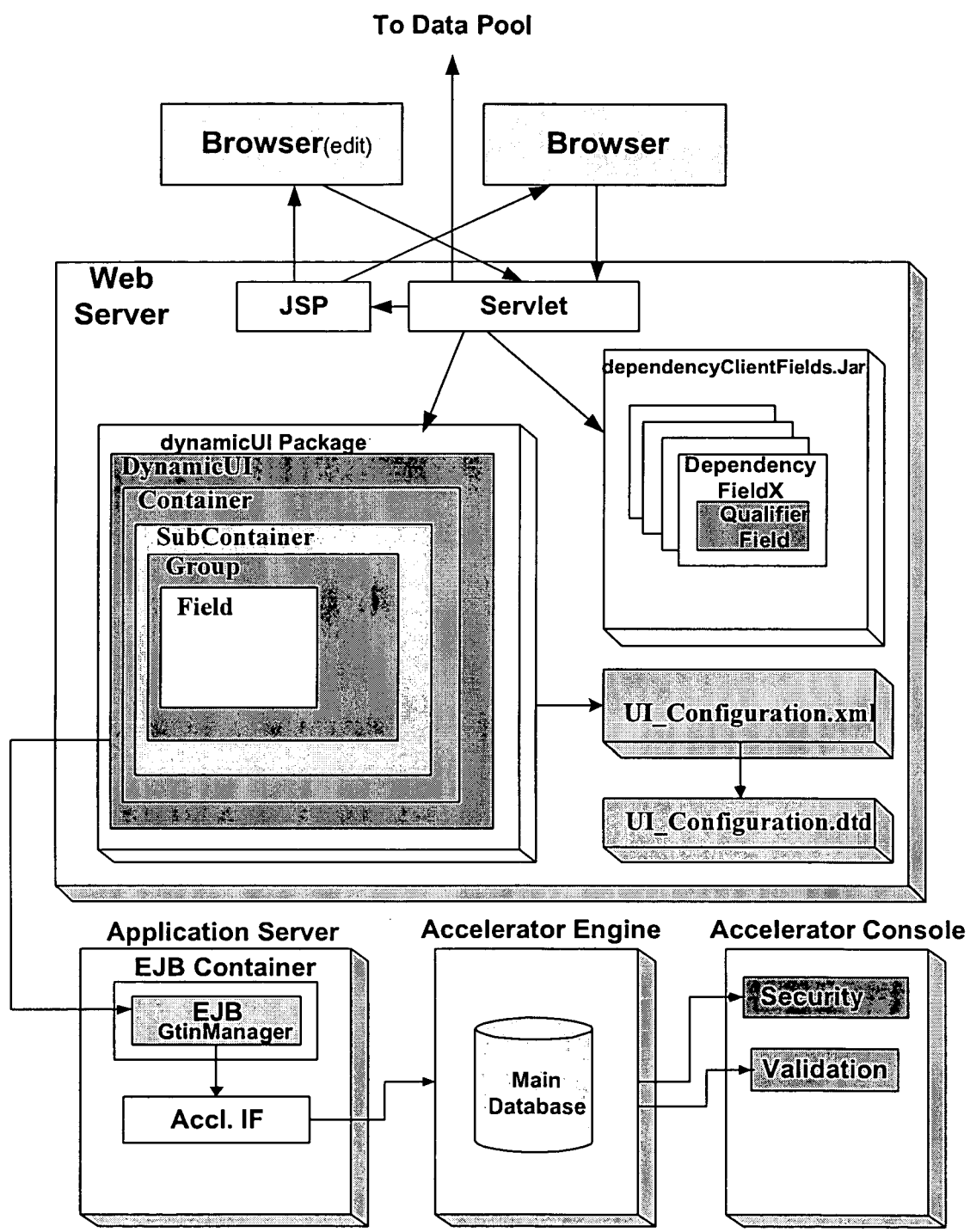
FIG. 1 is an architectural illustration of an embodiment of the invention comprising an N-tier architecture comprising browsers displaying web pages, a web server, an application server, and a database server executing an accelerator system.

A system and method for dynamically constructing user interfaces to a repository of synchronized business information will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention provide systems and methods for dynamically constructing customizable user interfaces. These user interfaces provide interface components and functions for acting upon or inputting data into a repository of synchronized business information. By way of example, but not limitation, user interfaces generated in accordance with the methods described herein can act as a mechanism for publishing Global Data Synchronization (GDS) information to a data pool. In this case the invention enables each respective entity in the supply chain to generate and make use of a user interface customized to suits their specific needs. For instance, a supplier (or someone acting on behalf of the supplier) may dynamically generate a set of user interfaces that enables the supplier to input and publish data to a data pool that will then share the published data across a supply chain.

User interfaces made in accordance with one or more embodiments of the invention are generated through the use of declarations that describe the data to be displayed and how the data should be displayed along with what dependencies, validations and required characteristics are associated with the data. In a typical case, systems implementing embodiments of the invention employ the use of a configuration file to define the declarations that detail the layout, content and behavior of the user interface. This configuration file configuration may contain XML or other data used to define key aspects of the user interface that is to couple with the synchronization system. Any compliant schema or DTD based XML parser can parse the XML data.

In at least one embodiment of the invention an N-tier architecture may be employed wherein a web server comprising Java ServerPages and/or Servlets may utilize java class files that parse and construct the graphical user interface from an XML user interface configuration file. In this embodiment of the invention, HTML pages are output to a diverse array of computing devices capable of executing a HTML compliant browser. The resulting dynamically created graphical user interfaces allow separate views of the data to be interacted with depending on the data pool that the data is intended for and these data pools may be switched by using a different declarative configuration at run time without recompiling and redistributing the application.

FIG. 1 is an architectural illustration of an embodiment of the invention comprising an N-tier architecture comprising browsers displaying web pages, a web server, an application server, a database server executing an accelerator engine. For purposes of visibility FIG. 1 does not have reference numbers.

Figure 1A:
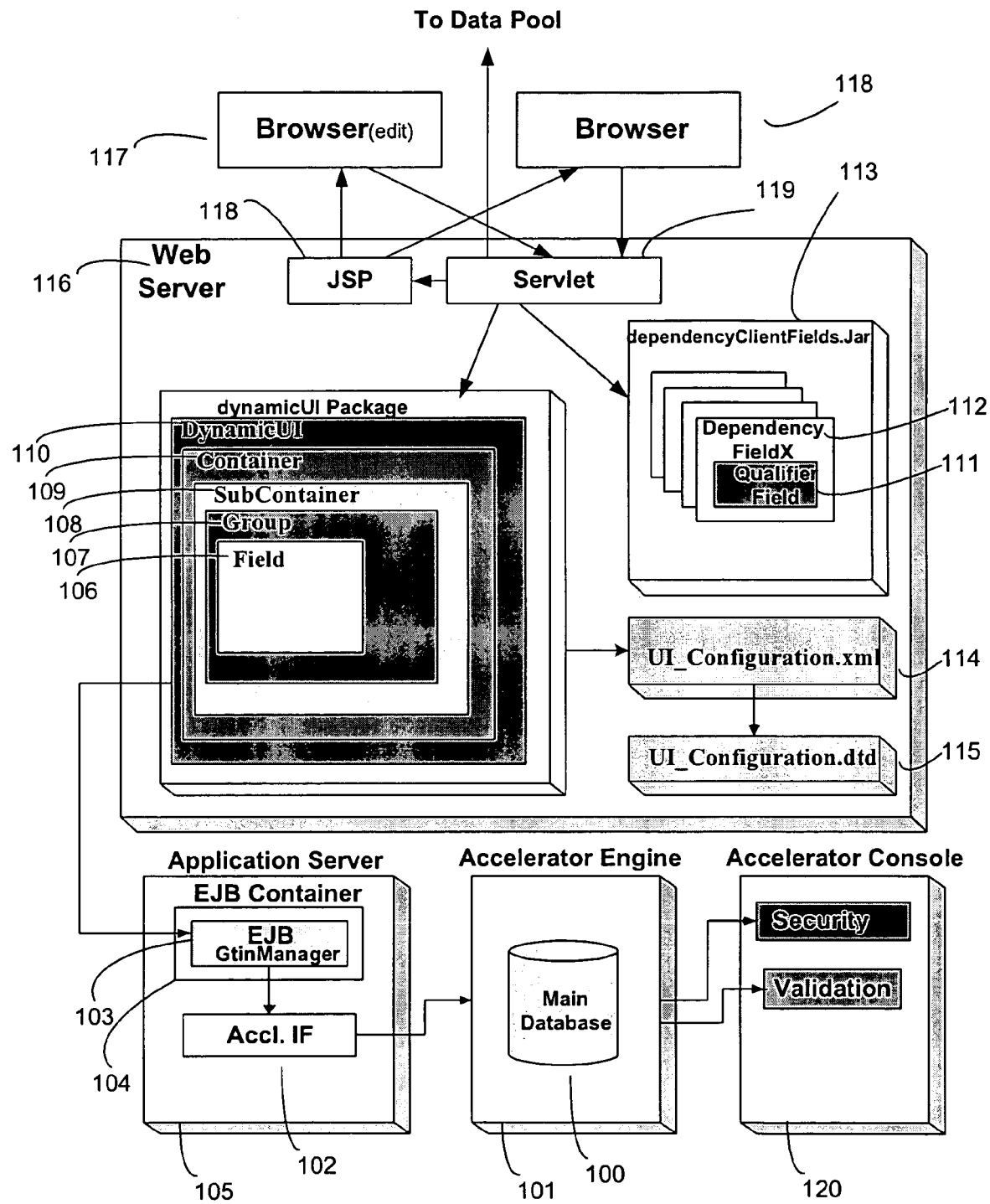
FIG. 1A illustrates FIG. 1 with reference numbers for the various components.

FIG. 1A contains the same components as FIG. 1 referenced by number as described below. In the embodiment of the invention illustrated in FIG. 1A a graphical user interface to be displayed on browser 117 or 118 is created by reading user interface configuration file 114 that comprises declarations detailing the layout and content of the interface. Various types of data can be configured to act as configuration file 114. An XML file, for instance, can provide a basis for defining the declarations and other information utilized by system to create the user interface and provide that interface with functionality that couples it to the synchronization system. Although the configuration file is described herein as an XML file any other data format is in keeping with the spirit of the invention. Systems implemented using XML may utilize any compliant schema based or DTD based XML parser to read the configuration file. In at least one embodiment of the invention an N-tier architecture is employed where web server 116 (which comprises Servlet 119 and Java ServerPage 118) may utilize java class files 106-110 to instantiate widgets or markup based on the entries in configuration file 114. HTML pages are output to a diverse array of computing devices capable of executing browser 117 or 118 for example an HTML browser or other component cable of rendered markup for display.

Operation of the implementation shown in FIG. 1A starts with a user making a request through browser 118 over a known URL for the application. Once the access over a known URL is accepted by Servlet 119, Servlet 119 acts as the controller in a Model-View-Controller (MVC) pattern and calls upon the dynamicUI package to determine if there are any dependent fields or dependencyClientFields classes 113 required to obtain the set of widgets or markup that are required. The instance of the UI configuration file to utilize is determined based on the incoming URL and/or the username and role of the user. In at least one embodiment of the invention the UI configuration file is targeted at a data pool as set by a data such as a flag, a file, a default or by the URL. Servlet 119 may branch based on the role and supply more or less information to browser 118 based on the role. For example, an administrator may be provided with a widget or markup that is enabled to allow the administrator to edit a price where a normal user may not have the privilege to edit.

When dynamicUI class 110 requests data to fill the markup or widgets it accesses application server 105, and requests the information from EJB GtinManager 103 residing in EJB container 104 that may be thought of conceptually as the "application server" instance. EJB GtinManager 103 acts as the Model in the MVC architecture and requests information from interface library Accelerator Interface 102 which requests data from Accelerator Server 101 that hosts main database 100. Accelerator Interface 102 comprises data access routines that allow for the retrieval of data from main database 100.

Although FIG. 1A only shows one Web Server and one Application it will be apparent to one skilled in the art that a cluster of web servers and/or a cluster of application servers may be utilized to provide unlimited scalability.

Requests to publish to the data pool are sent via Servlet 119 upon activation by a user controlling browser 118. Browser 117 or some other application may be used in order to alter user interface configuration file 114 in order to edit the layout, dependencies, validation or required field metadata. Once edited, all new instances of the application are automatically updated without recompiling and transmitting the application to client machines.

Figure 1B:
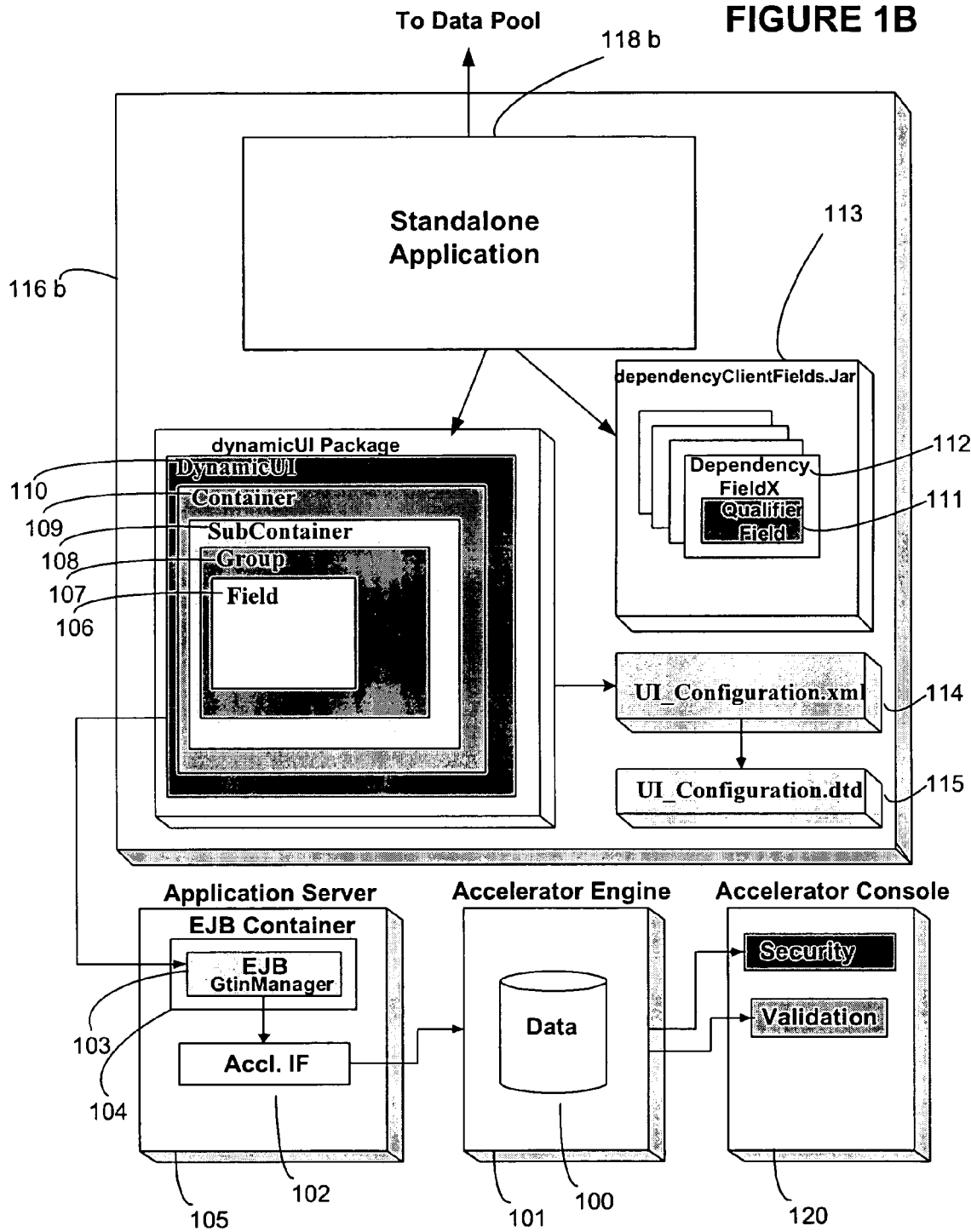
FIG. 1B illustrates an architectural diagram of an embodiment of the invention comprising a standalone application accessing an N-tier architecture comprising an application server, and a database server executing an accelerator system.

FIG. 1B is an architectural diagram of an embodiment of the invention comprising standalone application 118b executing on client computing element 116b in an N-tier architecture comprising an application server, an accelerator server hosting a database and an accelerator console system. In such an embodiment the same java classes as used in FIG. 1A may be utilized to construct java widgets instead of HTML markup. This building of java widgets may be accomplished by a bridge pattern or factory pattern as one of ordinary skill in the object oriented design patterns art will recognize. Standalone applications may provide quicker responses than HTML applications since there are no round trips required for certain operations such as validation. Rounds trips are not needed because validation occurs directly in the application. The downside of using standalone applications is that it is best to utilize a known version of a virtual machine (VM) to execute the application. Using a known VM enables information technology personal to successfully maintain the application. For this reason, standalone applications are generally used inside the corporate firewall while browser based applications are generally used outside the corporate firewall although there is no requirement for these configurations.

On startup, user interface configuration file 114 is opened and read for declarative definitions of containers, sub-containers, groups and fields. Checks for valid and well-formed XML may be performed at this time or may be performed before saving an edited user interface configuration file to minimize application initialization time. The processing loops until all elements defined by the user interface configuration file have been instantiated. In the case of FIG. 1B, this involves instantiating widgets and filling the widgets with data until there are no more widgets declared in user interface configuration file 114. User interface configuration DTD 115 is the element that is used in order to verify that user interface configuration file 114 is valid. This applies to the description of FIG. 1A as well.

If a field or sub-container interface appearance attribute is dependent upon the value of another field or fields then the logic rule is obtained as an external JAR file as per dependencyClientFields.jar 113. An instance of the logic rule class is then created via the Java Reflection API. For a web client interfacing to the system through a Java ServerPage (JSP) which acts as the view in the MVC architecture as per FIG. 1A, then the instance is local to the web server. For an applet instance or standalone application, the logic rule class is instantiated and utilized within the executable. The logic rule may set the dependent field or sub-container to enabled or disabled, visible or not visible, mandatory or not mandatory depending on the value of the field comprising the dependency. In addition, the dependency rule may be used to verify the basic nature of the data itself, or alternatively another attribute of the XML may declaratively specify an optional verifyField JAR file that provides basic single field input validation.

For security purposes embodiments of the invention may determine whether to display a field of the main database by checking the user name with regards to the table and field of the main database. The field may be visible or invisible to a given user or enabled or disabled to a given user depending on the user name and/or role of the user. This functionality may exist in Accelerator Interface 102 for example with the resulting boolean functions isVisible and isEnabled implementing the functionality required to determine if a table, field and user input yield a visible or enabled widget.

Embodiments of the invention utilizing a Java applet or standalone application may use the dependency JAR file(s) to validate fields, for dependency checking and required field checking on the client machine in the executable. For markup version of the application running in browsers, the dependency code may be written in JavaScript to enable local browser validation. Optionally, the dependency code for applet or standalone applications may be written in JavaScript or ECMAScript and parsed with a freeware embedded JavaScript interpreter such as FESI or Rhino. In this manner a code set may be utilized to provide the functionality for altering dependent fields regardless of the application ultimately utilizing the script, e.g., browser based markup or standalone executable application.

Figure 2:
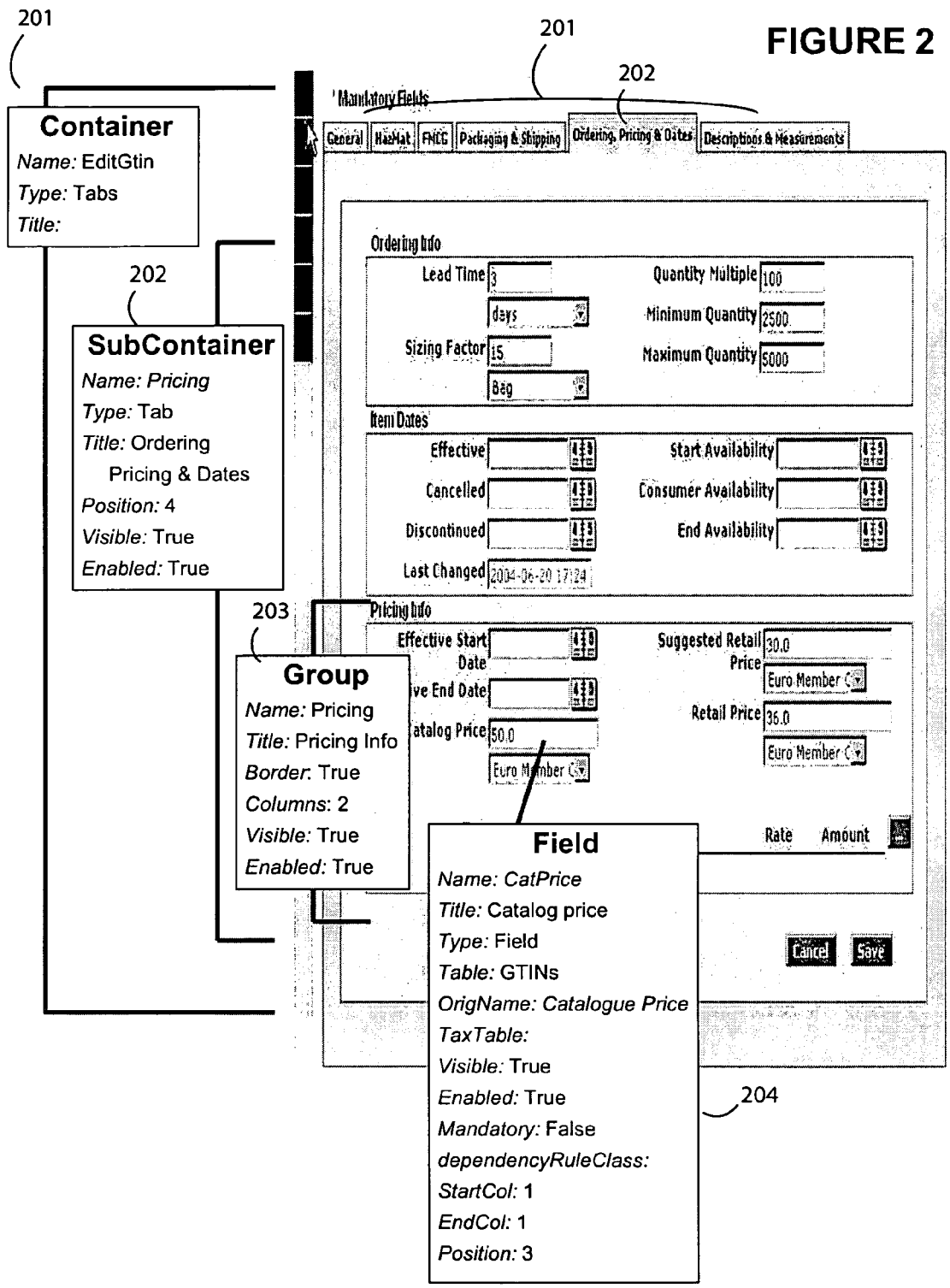
FIG. 2 illustrates an annotated screen region created with an embodiment of the invention showing Container, SubContainer, Group and Field elements with annotated metadata associated with each element.

FIG. 2 is an annotated screen dump of a graphical user interface created with an embodiment of the invention showing Container, SubContainer, Group and Field elements with annotated metadata associated with each element. Container 201 comprises a set of tabs shown in metadata form on the left of the diagram and as comprising the tabs across the top of the graphical user interface as defined by the metadata in the user interface configuration file as per FIG. 1A. One of the Sub-Containers of Container 201 is SubContainer 202, shown in metadata form on the left of the screen with corresponding graphical instantiation as the selected tab in the graphical user interface. SubContainer 202 has a title of "Ordering Pricing & Dates" and comprises Group 203 with title "Pricing Info". Group 203 comprises multiple widgets including Field 204 titled "Catalog Price". Field 204 comprises metadata called out in the bottom of the figure. All fields required by a particular data pool may be instantiated for a given graphical user interface for a given Global Trade Item Number or GTIN. By altering the affiliation of a company with another data pool a different user interface configuration file may be utilized in order to construct the graphical user interface of the application regardless of the type of user interface output, e.g., markup or widgets.

FIG. 3 is an embodiment of an XML listing that declaratively defines the interface of FIG. 2. The declaration of Container 201 is shown in FIG. 3 as the corresponding XML. SubContainer 202 titled "Ordering Pricing & Dates" is shown in graphical form on the top left of the figure and in the markup with other attributes such as "Position", i.e., SubContainer 202 is the $4^{th}$ tab from the left with the first tab numbered as zero. Group 203 titled "Pricing Info" is shown graphically in the lower left of the figure along with the corresponding markup on the right. Other attributes such as "border" are also included in the metadata and used in creating the instantiated markup or widget. Field 204 titled "Catalog Price" is shown graphically on the left and as the corresponding markup on the right of the figure. Arrows show the remaining correspondences without reference numbers for viewing ease. Any of the data entries or related attributes may be filled from the main database of FIG. 1A using a family hierarchy comprising a parent object or other construct as per one or more of the following patents, application or publications: U.S. Patent Application No. PCT/US05/41421 to Sapozhnikov et al., entitled "System And Method For Dynamically Modifying Synchronized Business Information Server Interfaces" filed Nov. 15, 2004, is hereby incorporated by reference. U.S. patent application Ser. No. 10/990,293 to Cherny et al., entitled "Accelerated System And Methods For Synchronizing, Managing, And Publishing Business Information" filed Nov. 15, 2004, is hereby incorporated by reference. U.S. patent application Ser. No. 09/577,268 to Hazi et al., entitled "Timeshared Electronic Catalog System And Method" filed May 23, 2000, is hereby incorporated herein by reference. U.S. Pat. No. 6,754,666 to Brookler et al., entitled "Efficient Storage And Access In A Database Management System" filed Aug. 21, 2000, is hereby incorporated herein by reference. U.S. patent application Ser. No. 09/643,316 to Brookler et al., entitled "Data Indexing Using Bit Vectors" filed Aug. 21, 2000, is hereby incorporated herein by reference. U.S. patent application Ser. No. 09/643,207 to Weinberg et al., entitled "Data Editing And Verification User Interface" filed Aug. 21, 2000, is hereby incorporated herein by reference. U.S. patent application Ser. No. 09/960,902 published as Publication No. 20020087510 to Weinberg et al., entitled "Method And Apparatus For Structuring, Maintaining, And Using Families Of Data" filed Sep. 20, 2001, is hereby incorporated herein by reference. U.S. patent application Ser. No. 10/022,056 published as Publication No. 20020194196 to Weinberg et al., entitled "Method And Apparatus For Transforming Data" filed Dec. 12, 2001, is hereby incorporated herein by reference. U.S. patent application Ser. No. 09/960,541 published as Publication No. 20020116417 to Weinberg et al., entitled "Method And Apparatus For Dynamically Formatting And Displaying Tabular Data In Real Time" filed Sep. 20, 2001, is hereby incorporated herein by reference. U.S. patent application Ser. No. 10/172,572 published as Publication No. 20030233347 to Weinberg et al., entitled "Method And Apparatus For Generating And Utilizing Qualifiers And Qualified Taxonomy Tables" filed Jun. 13, 2002, is hereby incorporated herein by reference.

By looping through the user interface configuration file and creating Containers, SubContainers, Groups and Fields for all entries in the file, the graphical user interface is created. By encoding the data pool desired for viewing into the incoming URL or as a configuration parameter in the case of a standalone application, the proper user interface configuration file may be opened and read in order to create the graphical user interface that corresponds to the desired data pool. This dynamic functionality allows for a company to switch allegiance to another company's data pool product without requiring massive reconstruction, compilation and distribution of a global data synchronization application.

FIG. 4 is an embodiment of an XML listing that declaratively defines a rule class to be used in determining the settings of dependent fields when a particular field is altered. Field 401 shows the attributes "Enabled", "Mandatory" and "dependencyRuleClass" as set in order to enable interception of a change event in the field. In one embodiment of the invention, if the "Hazmat Information Required" field is checked, then a "Regulation Code" is required for entry as Mandatory. The "Regulation Code" may then be set based on the "Class", "Packing Group" and "UN Number". When these fields are set to particular values, then the "Regulation Code" pull down list may provide only those choices that are allowed given the settings of the other fields. In markup terms, when a field is changed, a round trip to the Servlet may provide another web page via a Java ServerPage with the "Regulation Code" pull down list set with different values. For a standalone application, the list used by the pulldown may be programmatically set without a trip to another server. Providing dependency support on the graphical user interface enables potential data input errors to be avoided at the frontmost level of the program instead of relying on a trip to the application server or even worse the data pool validator. This saves time for the data input personnel and lowers costs for the company.

One embodiment of the invention comprises the following Application Programming Interface enabling the construction and operation of the graphical dynamic user interfaces generated:

Package name: com.xyz.gds.xxx

This package contains the following five classes.

DynamicUI class bean—This class parses the user interface configuration XML file and returns the outermost container level of the UI hierarchy. In addition, this class contains functions that allow for the editing of user interface configure XML files.

Main Methods:

setUser(String user)—set user name every session.

parseXml( )—parse xml file, create and initialize dynamic UI classes.

getContainers( )—return array list of containers.

addContainer(Container container)—add new container into array list of Containers.

addSubContainer(String container, SubContainer subcontainer)—add new sub container into container.

addGroup(String subContainer, Group group)—add new group into sub container.

addField(String group, Field field)—add new field into group.

removeContainer(String container)—remove container from array list of containers.

removeSubContainer(String subContainer)—remove Sub Container from Container.

removeGroup(String group)—remove group from Sub Container.

removeField(String field)—remove field from Group.

updateXml( )—update xml file with array list of Containers.

Container class—This class holds the attribute values of the element Container and collection of the class—Sub Containers (second level in the hierarchy of dynamic UI).

Main Methods:

get/setType( )—get or set Container Type.

get/setTitle( )—get or set Container Title.

SubContainer class—This class holds the attribute values of the element SubContainer and collection of the class—Groups (third level in the hierarchy of dynamic UI).

Main Methods:

get/setType( )—get or set type.

get/setTitle( )—get or set title.

get/setPosition( )—get or set position.

Group class—This class holds the attribute values of the element Groups and collection of the class—Fields (fourth level in the hierarchy of dynamic UI).
Main Methods:
get/setTitle( )—get or set title.
get/setBorder( )—get or set border.
get/setColumn( )—get or set position.
Field class—This class holds the attribute values of the element Fields, the lowest element in the dynamic UI hierarchy.
Main Methods:
get/setTitle( )—get or set title.
get/setType( )—get or set type.
get/setTable( )—get or set table.
get/setOrigName( )—get or set origName.
get/setTaxTable( )—get or set taxTable.
get/setVisible( )—get or set if field is visible or dependent.
get/setEnabled( )—get or set if field is enabled or dependent.
get/setMandatory( )—get or set if field is mandatory or dependent.
get/setStartCol( )—get or set startCol.
get/setEndCol ( )—get or set endCol.
get/setPosition( )—get or set position
get/set dependencyRule—get or set dependency rule.
DependencyClientFields Jar
This package contains the following two classes.
DependencyField class—This class contains the dependency logic for the specific dependency field in the UI. The dependency can be for any attribute of the field.
Main Methods:
setDependencyAttr—set dependency attribute, enabled, visible etc.
getQualifiedFields—return list of QualifiedField class, this class holds the description of the qualified field (the field that the above field depends on).
setQualifiedFieldValues (List qualifiedFields)—set qualified fields with their values.
IsEnabled/Visible/Mandatory ( ) —return if the field is enabled/Visible/Mandatory, consider the qualifier fields value.
QualifiedField—This class describes the qualified field for the dependent field.
The class contains three fields:
table (String)—table name of the field.
field (String)—field name.
value (Object)—field value.

Thus embodiments of the invention directed to a system and method for dynamically constructing user interfaces to a repository of synchronized business information have been exemplified to one of ordinary skill in the art. The claims, however, and the full scope of any equivalents are what define the metes and bounds of the invention.

What is claimed is:

1. A computer program product for dynamically constructing user interfaces to a repository of business information comprising:
    a computer usable memory medium having computer readable program code embodied therein wherein said computer readable program code is configured to:
        obtain a user interface configuration file from said computer usable memory medium wherein said user interface configuration file references data to be globally synchronized with a data pool;
        verify said data via a first declarative statement in said user interface configuration file;
        present said data on a graphical user interface via a second declarative statement in said user interface configuration file, wherein said graphical user interface provides functions for publishing to a data synchronization system;
        obtain a user gesture via said graphical user interface; and
        alter said graphical user interface based on a dependency obtained from said user interface configuration file via a third declarative statement that references a first data element and a second data element selected from said data wherein said first data element is displayed on said graphical user interface.

2. A computer program product for dynamically constructing user interfaces to a repository of business information comprising:
    a computer usable memory medium having computer readable program code embodied therein wherein said computer readable program code is configured to:
        obtain a user interface configuration file from said computer usable memory medium wherein said user interface configuration file references data to be globally synchronized with a data pool;
        verify said data via a first declarative statement in said user interface configuration file, wherein said first declarative statement used to verify said data is based on a parent object in a hierarchy defined by a family table;
        present said data on a graphical user interface via a second declarative statement in said user interface configuration file;
        obtain a user gesture via said graphical user interface; and
        alter said graphical user interface based on a dependency obtained from said user interface configuration file via a third declarative statement that references a first data element and a second data element selected from said data wherein said first data element is displayed on said graphical user interface.

3. A computer program product for dynamically constructing user interfaces to a repository of business information comprising:
    a computer usable memory medium having computer readable program code embodied therein wherein said computer readable program code is configured to:
        obtain a user interface configuration file from said computer usable memory medium wherein said user interface configuration file references data to be globally synchronized with a data pool;
        verify said data via a first declarative statement in said user interface configuration file;
        present said data on a graphical user interface via a second declarative statement in said user interface configuration file, wherein said data presented in said graphical user interface is obtained from a parent object in a hierarchy defined by a family table;
        obtain a user gesture via said graphical user interface; and
        alter said graphical user interface based on a dependency obtained from said user interface configuration file via a third declarative statement that references a first data element and a second data element selected from said data wherein said first data element is displayed on said graphical user interface.

4. A computer program product for dynamically constructing user interfaces to a repository of business information comprising:

a computer usable memory medium having computer readable program code embodied therein wherein said computer readable program code is configured to:

obtain a user interface configuration file from said computer usable memory medium wherein said user interface configuration file references data to be globally synchronized with a data pool;

verify said data via a first declarative statement in said user interface configuration file;

present said data on a graphical user interface via a second declarative statement in said user interface configuration file;

obtain a user gesture via said graphical user interface; and alter said graphical user interface based on a dependency obtained from said user interface configuration file via a third declarative statement that references a first data element and a second data element selected from said data wherein said first data element is displayed on said graphical user interface, wherein said third declarative statement used to alter said graphical user interface based on a dependency is based on a parent object in a hierarchy defined by a family table.

5. In a computer system, a method for dynamically constructing user interfaces to a repository of business information comprising:

obtaining a user interface configuration file comprising data to be globally synchronized with at least one data pool;

verifying said data based on a parent object in a hierarchy defined by a family table;

verifying said data via a first declarative statement from said user interface configuration file;

presenting said data on a graphical user interface via a second declarative statement in said user interface configuration file;

obtaining a user gesture via said graphical user interface; and altering said graphical user interface based on a dependency obtained from said user interface configuration file via a third declarative statement that references a first data element and a second data element selected from said data wherein said first data element is displayed on said graphical user interface.

6. In a computer system, a method for dynamically constructing user interfaces to a repository of business information comprising:

obtaining a user interface configuration file comprising data to be globally synchronized with at least one data pool;

verifying said data via a first declarative statement from said user interface configuration file;

presenting said data on a graphical user interface via a second declarative statement in said user interface configuration file, wherein said presenting said data via said graphical user interface is performed by obtaining said data from a parent object in a hierarchy defined by a family table;

obtaining a user gesture via said graphical user interface; and altering said graphical user interface based on a dependency obtained from said user interface configuration file via a third declarative statement that references a first data element and a second data element selected from said data wherein said first data element is displayed on said graphical user interface.

7. In a computer system, a method for dynamically constructing user interfaces to a repository of business information comprising:

obtaining a user interface configuration file comprising data to be globally synchronized with at least one data pool;

verifying said data via a first declarative statement from said user interface configuration file;

presenting said data on a graphical user interface via a second declarative statement in said user interface configuration file;

obtaining a user gesture via said graphical user interface; and altering said graphical user interface based on a dependency obtained from said user interface configuration file via a third declarative statement that references a first data element and a second data element selected from said data wherein said first data element is displayed on said graphical user interface, wherein said altering said graphical user interface based on a dependency is based on a dependency obtained from a parent object in a hierarchy defined by a family table.

\* \* \* \* \*